United States Patent
Rea et al.

(10) Patent No.: US 9,537,164 B2
(45) Date of Patent: Jan. 3, 2017

(54) THROUGH-STACK COMMUNICATION METHOD FOR FUEL CELL MONITORING CIRCUITS

(75) Inventors: David D. Rea, Pittsford, NY (US); Kenneth L. Kaye, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1906 days.

(21) Appl. No.: 12/840,030

(22) Filed: Jul. 20, 2010

(65) Prior Publication Data

US 2012/0019252 A1 Jan. 26, 2012

(51) Int. Cl.
*H01M 8/04* (2016.01)
(52) U.S. Cl.
CPC .......... *H01M 8/04559* (2013.01); *Y02E 60/50* (2013.01)
(58) Field of Classification Search
CPC ...................... H01M 8/04552; H01M 8/04559
USPC ........................................................ 324/429
See application file for complete search history.

(56) References Cited

U.S. PATENT DOCUMENTS

| | | | |
|---|---|---|---|
| 5,763,113 A * | 6/1998 | Meltser et al. | 429/432 |
| 6,214,487 B1 | 4/2001 | Kelley et al. | |
| 6,589,682 B1 * | 7/2003 | Fleckner et al. | 429/458 |
| 7,099,787 B2 * | 8/2006 | Gasda et al. | 702/63 |
| 7,445,647 B1 * | 11/2008 | Davis et al. | 29/623.2 |
| 7,776,485 B1 * | 8/2010 | Davis et al. | 429/458 |
| 2006/0141299 A1 * | 6/2006 | Piccirillo | 429/13 |
| 2008/0143543 A1 * | 6/2008 | Vandensande et al. | 340/636.1 |

* cited by examiner

*Primary Examiner* — Drew A Dunn
*Assistant Examiner* — Jerry D Robbins
(74) *Attorney, Agent, or Firm* — John A. Miller; Miller IP Group, PLC

(57) ABSTRACT

A system and method for monitoring fuel cells in a fuel cell group. The system includes a sensor circuit, such as a voltage sensor circuit, that monitors a condition of the fuel cells. If the sensor circuit detects a low performing cell, then it sends a signal to a tone generator that generates a frequency signal that switches a load into and out of the cell group. A voltage sensor detects the voltage of the cell group including the frequency signal, and sends the detected voltage signal to a tone decoder that decodes the frequency signal to determine that the fuel cells are low performing.

12 Claims, 2 Drawing Sheets

THROUGH-STACK COMMUNICATION METHOD FOR FUEL CELL MONITORING CIRCUITS

BACKGROUND OF THE INVENTION

1. Field of the Invention

This invention relates generally to a system and method for monitoring the performance of fuel cells in a fuel cell stack and, more particularly, to a system and method for monitoring the performance of fuel cells in a fuel cell stack that includes a sensor for detecting an undesirable condition of the fuel cells and a tone generator that generates an AC tone in response to the detected condition that can be detected by suitable circuitry.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As a fuel cell stack ages, the performance of the individual fuel cells in the stack degrade differently as a result of various factors. There are different causes of low performing cells, such as cell flooding, loss of catalyst, etc., some temporary and some permanent, some requiring maintenance, and some requiring stack replacement to exchange those low performing cells. Although the fuel cells are electrically coupled in series, the voltage of each cell when a load is coupled across the stack decreases differently where those cells that are low performing have lower voltages. Thus, it is necessary to monitor the cell voltages of the fuel cells in a stack to ensure that the voltages of the cells do not drop below a predetermined threshold voltage to prevent cell voltage polarity reversal, possibly causing permanent damage to the cell.

Typically, the voltage output of every fuel cell in a fuel cell stack is monitored so that the system knows if a fuel cell voltage is too low, indicating a possible failure. As is understood in the art, because all of the fuel cells are electrically coupled in series, if one fuel cell in the stack fails, then the entire stack will fail. Certain remedial actions can be taken for a failing fuel cell as a temporary solution until the fuel cell vehicle can be serviced, such as increasing the flow of hydrogen and/or increasing the cathode stoichiometry.

Fuel cell voltages are often measured by a cell voltage monitoring sub-system that includes an electrical connection to each bipolar plate, or some number of bipolar plates, in the stack and end plates of the stack to measure a voltage potential between the positive and negative sides of each cell. Therefore, a 400 cell stack may include 401 wires connected to the stack. Because of the size of the parts, the tolerances of the parts, the number of the parts, etc., it may be impractical to provide a physical connection to every bipolar plate in a stack with this many fuel cells, and the number of parts increases the cost and reduces the reliability of the system.

As discussed above, it is known in the art to process the electric signals of the fuel cells in a fuel cell stack to determine whether the fuel cell stack is functioning as desired. Often, electric signal processing is done every other cell because of the costs associated with monitoring every cell. Furthermore, it can be difficult to provide the necessary components in the space available to monitor every cell. In order to eliminate the necessity to connect fuel cell measurement circuits to a fuel cell stack using a plurality of interconnecting wires, it is desirable to embed such measurement circuits directly within the structure of the fuel cell stack assembly. Such an embedded measurement circuit would not add significant costs, and would allow for every fuel cell to be monitored.

SUMMARY OF THE INVENTION

In accordance with the teachings of the present invention, a system and method are disclosed for monitoring fuel cells in a fuel cell group. The system includes a sensor circuit, such as a voltage sensor circuit, that monitors a condition of the fuel cells. If the sensor circuit detects a low performing cell, then it sends a signal to a tone generator that generates a frequency signal that switches a load into and out of the cell group. A voltage sensor detects the voltage of the cell group including the frequency signal, and sends the detected voltage signal to a tone decoder that decodes the frequency signal to determine that the fuel cells are low performing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for monitoring abnormal fuel cell conditions is merely exemplary in nature, and is in no way intended to limit the invention or its applications or uses.

Figure 1:
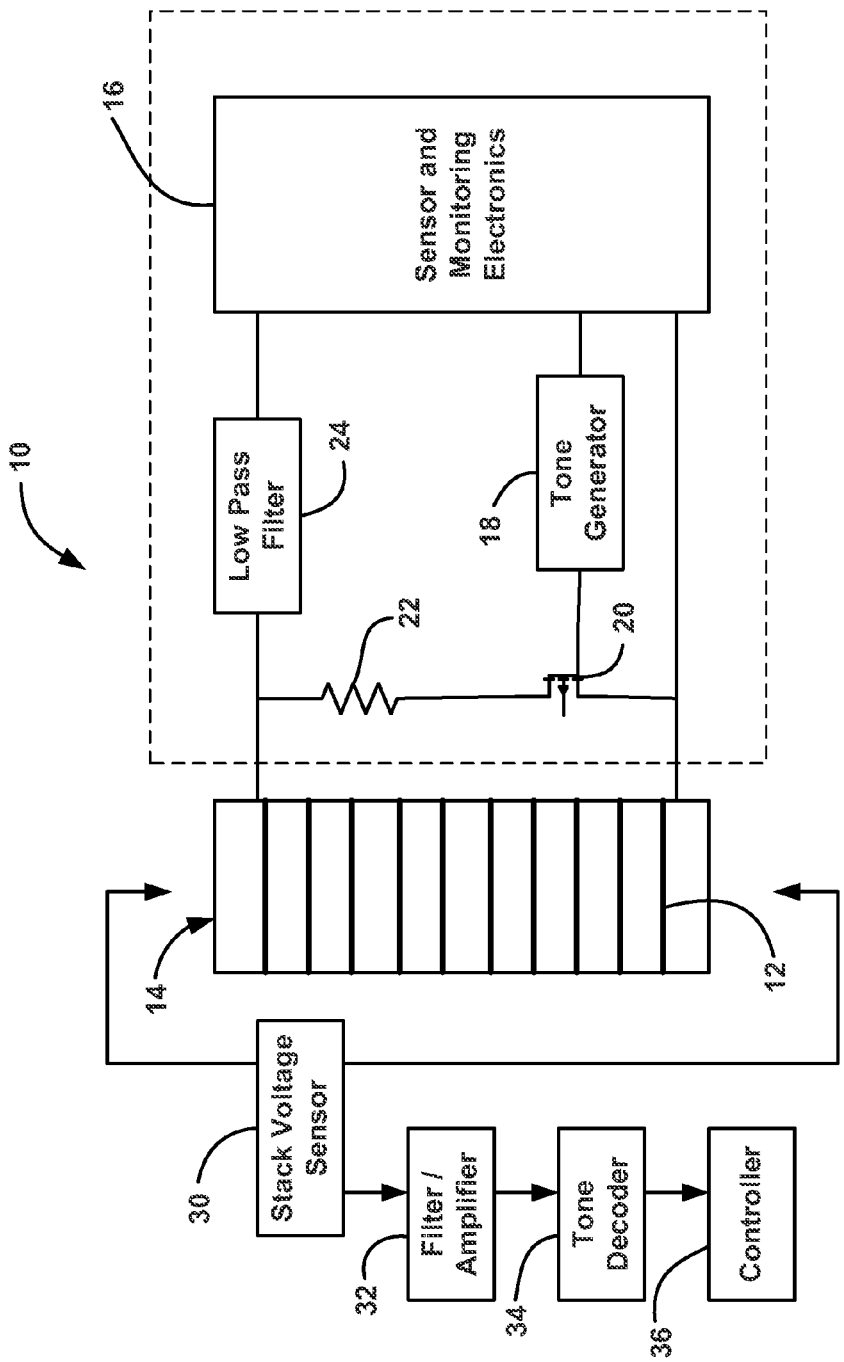
FIG. 1 is a schematic block diagram of a system for monitoring fuel cells in a fuel cell group.

FIG. 1 is a schematic block diagram of a fuel cell system 10 for monitoring the performance of fuel cells 12 in a fuel cell group 14. In one non-limiting embodiment, the fuel cell group 14 includes about fifteen fuel cells. The fuel cell group 14 can be part of a fuel cell stack including many such fuel cell groups where a separate system 10 would be provided for monitoring the performance of the fuel cells in each separate fuel cell group. Thus, for automotive applications that may include 400 or so fuel cells in a fuel cell stack, there may be 20-30 such fuel cell systems.

A sensor circuit 16 including sensor monitoring electronics is coupled across the fuel cells 12 and is able to detect a certain operating condition of the fuel cells 12. In one non-limiting embodiment, the sensor circuit 16 includes a voltage sensor that measures the voltage of the fuel cells 12 in the fuel cell group 14. In other embodiments, the sensor circuit 16 may detect other conditions, such as humidity, temperature, high frequency resistance (HFR), etc. When the sensor circuit 16 detects the condition indicating an abnormal or undesirable fuel cell operation, such as low voltage, the monitoring electronics within the sensor circuit 16 sends a signal to a tone generator 18 that provides a signal to an MOSFET switch 20 that switches the switch 20 on and off. When the switch 20 is closed, a load 22, such as a resistive load, is coupled across the cell group 14, and when the switch 20 is opened, the load 22 is disconnected from the cell group 14 which causes a frequency signal to be applied to the cell group 14. The frequency that the tone generator switches the switch 20 determines the frequency of the AC signal applied to the cell group 14. A low pass filter 24 prevents the frequency signal from being detected by the sensor circuit 16. Typically, the frequency signal provided by the tone generator 18 will be a relatively high frequency, such as greater than 10 kHz. The frequency signal applied to the fuel cell group 14 is provided on top of the DC power signal provided by the fuel cell group 14.

Figure 2:
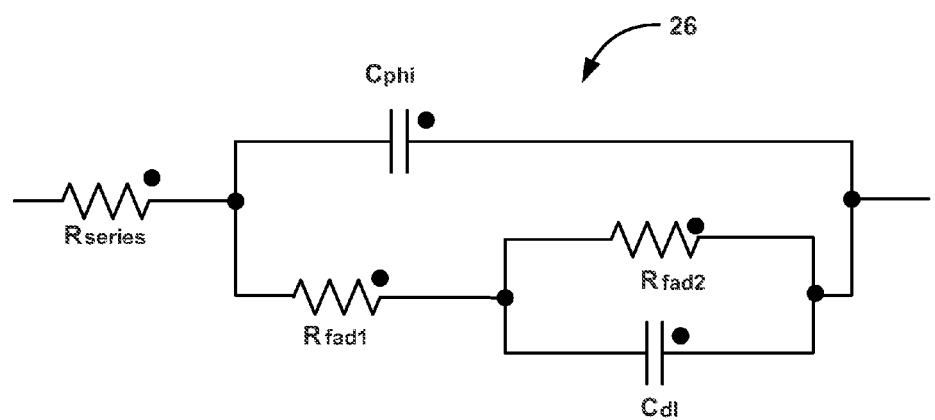
FIG. 2 is an equivalent circuit of a fuel cell in the fuel cell group shown in FIG. 1.

By switching the load 22 into and out of the cell group circuit, a capacitance at the electrodes of the MEAs in each cell 12 is charged and then is discharged during the time that the switch 20 is open that generates a detectable signal. FIG. 2 is an equivalent circuit 26 for a fuel cell showing a pseudo-capacitance 28 ($C_{phi}$) that represents the capacitance that is discharged and generates the detectable signal.

Alternately, the tone generator 18 can provide a modulated signal that is applied directly across the cell group 14 to provide the AC signal that is detected. Further, multiple tones can be provided by the tone generator 18 to be used for reduction of BOP interference.

Lines are connected to the sensor circuit 16 at the ends of the cell group 14, as shown, and provide power for the sensor circuit 16. Further, these lines can be used to detect the voltage, or other condition, of the cell group 14 as a single detectable value. However, the sensor circuit 16 is intended to represent any sensor that can detect some or all of the voltages of the cells 12 in the cell group 14, or some other condition of each cell 12, although individual lines are not specifically shown connected to the sensor circuit 16 from each cell 12. Further, the combination of the sensor circuit 16, the tone generator 18, the switch 20, the load 22 and the low pass filter 24 can be combined and embedded in the fuel cell stack to conserve space.

When the frequency signal is applied to the cell group 14, external sensing circuitry from the cell group 14 is used to detect that signal as an indication that some problem may exist with the fuel cells 12. A stack voltage sensor 30 detects the voltage of the entire fuel cell stack of which the cell group 14 is a part of. Other cell groups within the fuel cell stack can be monitored by other systems 10. In addition to detecting the stack voltage, the sensor 30 also detects the AC frequency signal when it is applied by the tone generator 18. A filter/amplifier circuit 32 removes the DC cell voltage from the voltage detected by the sensor 30, so that the AC frequency signal is all that remains, and amplifies the frequency signal. A tone decoder 34 detects the AC frequency signal and is tuned to the tone generator 18. If the tone decoder 34 does detect the AC frequency signal, then it provides a control logic signal to a system controller 36 indicating that there is a problem with the cell group 14, and possibly a specific cell 12 within the cell group 14. Each of the tone generators 18 in each of the systems 10 associated with the particular fuel cell stack can generate different tones that can be decoded by the tone decoder 34 so that the controller 36 knows which of the systems 10 is providing the AC frequency signal for that particular cell group 14.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for monitoring fuel cells in a fuel cell group, said system comprising:
    at least one sensor circuit for monitoring a condition of the fuel cells in the fuel cell group;
    a tone generator for applying a frequency signal to the cell group if the sensor detects the condition, wherein the at least one sensor circuit and the tone generator are embedded in a fuel cell stack;
    a tone decoder for detecting the frequency signal from the cell group generated by the tone generator;
    a voltage sensor for measuring the voltage across the fuel cell group and generating a sensor signal including a cell group voltage and the frequency signal; and
    a filter for filtering out the cell group voltage from the sensor signal and providing the frequency signal to the tone decoder.

2. The system according to claim 1 further comprising a switch and a load, said tone generator switching the switch on and off to connect the load across the fuel cell group and disconnect the load from the fuel cell group to generate the frequency signal.

3. The system according to claim 2 wherein the switch is a semiconductor switch.

4. The system according to claim 2 wherein the load is a resistive load.

5. The system according to claim 1 further comprising a low pass filter for preventing the frequency signal from being detected by the sensor circuit.

6. The system according to claim 1 wherein the cell group is part of a fuel cell stack including a plurality of cell groups, each cell group including a separate sensor circuit and a tone generator for providing a frequency signal to the cell group.

7. The system according to claim 1 wherein the at least one sensor circuit monitors a voltage of the fuel cells in the fuel cell group.

8. The system according to claim 7 wherein the sensor circuit monitors the voltage of each fuel cell in the fuel cell group.

9. A system for monitoring fuel cells in a fuel cell group, said fuel cell group being part of a fuel cell stack, said system comprising:
   a sensor circuit for monitoring the voltage of one or more of the fuel cells in the fuel cell group;
   a tone generator for generating a tone signal if the voltage of the fuel cells detected by the sensor circuit falls below a predetermined threshold;
   a switch receiving the tone signal from the tone generator and switching on and off in response to the frequency of the tone signal;
   a load coupled to the switch and being coupled across and being disconnected from the fuel cell group as the switch opens and closes to provide a frequency signal on the cell group;
   a low pass filter for preventing the frequency signal from being detected by the sensor circuit, wherein the sensor circuit, the tone generator, the switch, the load and the low pass filter are embedded in a fuel cell stack;
   a voltage sensor for measuring the voltage across the fuel cell group and providing a sensor signal including a cell group voltage and the frequency signal;
   a filter for filtering out the cell group voltage from the sensor signal; and
   a tone decoder receiving and decoding the frequency signal from the filter.

10. The system according to claim 9 wherein the switch is a semiconductor switch.

11. The system according to claim 9 wherein the load is a resistive load.

12. The system according to claim 9 wherein the sensor circuit monitors the voltage of each fuel cell in the fuel cell group.

* * * * *